(12) United States Patent
Soran et al.

(10) Patent No.: US 9,743,793 B1
(45) Date of Patent: Aug. 29, 2017

(54) ADJUSTABLE PEELING UTENSIL

(71) Applicants: Camelia Maria Soran, Anaheim, CA (US); Cosmin Radu Crisan, Anaheim, CA (US)

(72) Inventors: Camelia Maria Soran, Anaheim, CA (US); Cosmin Radu Crisan, Anaheim, CA (US)

( * ) Notice: Subject to any disclaimer, the term of this patent is extended or adjusted under 35 U.S.C. 154(b) by 0 days.

(21) Appl. No.: 15/449,681

(22) Filed: Mar. 3, 2017

(51) Int. Cl.
*A47J 17/02* (2006.01)
*A47J 17/04* (2006.01)

(52) U.S. Cl.
CPC ............. *A47J 17/02* (2013.01); *A47J 17/04* (2013.01)

(58) Field of Classification Search
CPC ................................. A47J 17/02; A47J 17/04
USPC ...... 30/246, 280, 293, 294, 1, 353, 314, 317
See application file for complete search history.

(56) References Cited

U.S. PATENT DOCUMENTS

| 278,686 | A | * | 6/1883 | Daigneau | ............... | A01G 23/12 |
| | | | | | | 144/208.92 |
| D23,872 | S | * | 12/1894 | Kellog | ................. | B26B 27/00 |
| | | | | | | D30/159 |
| 1,149,436 | A | * | 8/1915 | Frat | ................... | B26B 27/00 |
| | | | | | | 30/280 |
| 1,818,964 | A | * | 8/1931 | Smith | ................. | A01G 23/12 |
| | | | | | | 30/121 |
| 1,825,859 | A | * | 10/1931 | Foy | ................... | B27G 17/02 |
| | | | | | | 30/294 |
| 2,097,811 | A | * | 11/1937 | Foley | ................... | B29D 30/68 |
| | | | | | | 219/230 |
| 2,551,156 | A | | 5/1951 | Polk et al. | | |
| 2,639,654 | A | * | 5/1953 | Baunsgard | ............... | A01B 1/06 |
| | | | | | | 172/354 |
| 2,735,180 | A | * | 2/1956 | Pill | ........................ | C14B 1/16 |
| | | | | | | 30/171 |
| 2,870,572 | A | * | 1/1959 | Grissett | ................... | A01G 3/00 |
| | | | | | | 144/208.92 |

(Continued)

FOREIGN PATENT DOCUMENTS

| CN | 87206239 U | 2/1988 |
| CN | 87206239 U | 3/2006 |
| WO | WO2013046203 | 4/2013 |

OTHER PUBLICATIONS

"How to cut a Pineapple" https://www.youtube.com/watch?v=IH7nfHbfHBY dated May 3, 2011.*

*Primary Examiner* — Sean Michalski
(74) *Attorney, Agent, or Firm* — Cionca Law Group P.C.; Marin Cionca

(57) ABSTRACT

An adjustable peeling utensil for peeling an exterior portion from an interior portion of a fruit or vegetable, having: a base having a front side, a back side, a left side, a right side, a top side, and a bottom side; the base being associated with a handle on the back side and having a support bar slideably associated with the front side; and a U-shaped adjustable blade having a front blade side with a cutting edge, a left blade side with a left cutting edge, and a right blade side with a right cutting edge; the U-shaped adjustable blade being slideably associated with the left side and the right side of the base such that the U-shaped adjustable blade is extendable from the front side, to a selected distance between the support bar and the front blade side matching a thickness of the exterior portion; and a locking element.

16 Claims, 19 Drawing Sheets

(56) References Cited

U.S. PATENT DOCUMENTS

| | | | | |
|---|---|---|---|---|
| 2,992,483 A * | 7/1961 | Ricci | B29C 37/02 | 30/280 |
| 3,086,287 A * | 4/1963 | Cook | B27L 1/06 | 30/121 |
| 3,270,368 A * | 9/1966 | Cook, Sr. | A22C 25/02 | 30/304 |
| 3,424,214 A | 1/1969 | Vadas | | |
| 3,473,588 A * | 10/1969 | Loveland | A23N 4/20 | 426/482 |
| 3,528,470 A * | 9/1970 | De Back | A23N 4/20 | 426/482 |
| 4,021,912 A * | 5/1977 | Stanfield | B26B 5/008 | 157/13 |
| 4,046,109 A * | 9/1977 | Miller | A01K 13/002 | 119/631 |
| 4,358,893 A * | 11/1982 | Stanfield | B29C 37/02 | 30/280 |
| 4,656,936 A | 4/1987 | Bardon | | |
| 5,257,457 A * | 11/1993 | Cotter | A01G 23/099 | 30/121 |
| 5,437,100 A * | 8/1995 | Oberloier | B26B 27/002 | 30/116 |
| 5,461,971 A * | 10/1995 | Brooks | A47J 17/02 | 241/169.1 |
| D364,490 S * | 11/1995 | Zentner | B26B 27/00 | D30/158 |
| 5,575,070 A * | 11/1996 | Anderson | B26B 29/02 | 30/283 |
| 5,791,052 A * | 8/1998 | Bar-Or | B26B 3/00 | 30/121 |
| 5,806,414 A | 9/1998 | Heinzen et al. | | |
| 5,865,110 A | 2/1999 | Yonezawa | | |
| 6,446,830 B1 * | 9/2002 | Ocic | A47G 19/2205 | 220/752 |
| 7,603,783 B2 * | 10/2009 | Lee | B27G 17/02 | 30/482 |
| 7,874,076 B2 * | 1/2011 | Gratsias | B26B 21/522 | 16/430 |
| 7,937,842 B2 * | 5/2011 | Vanderbeek | B27G 17/02 | 30/487 |
| 8,015,715 B2 * | 9/2011 | Perkins | B27B 17/00 | 30/371 |
| 9,364,019 B2 * | 6/2016 | Healy | A23N 4/12 | |

\* cited by examiner

ADJUSTABLE PEELING UTENSIL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The invention relates generally to kitchen utensils and more specifically to handheld peelers.

2. Description of the Related Art

Fruits or vegetables having an exterior rind that must be removed may require a tool for removal of the rind, skin, or peel. Users may find existing utensil difficult or cumbersome to use, and a single tool may not be suitable for different sizes or types of fruits or vegetables. Thus, there is a need for a more convenient and efficient tool or method for removal of the exterior portion of a fruit or vegetable.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an adjustable peeling utensil configured to peel an exterior portion from an interior portion of a fruit or vegetable is provided. The adjustable peeling utensil may be provided with a flat base having a front side, a back side, a left side, a right side, a top side, and a bottom side; the flat base being associated with a handle on the back side and having a support bar slideably associated with the front side; and a U-shaped adjustable blade having a front blade side with a leading cutting edge, a left blade side with a left side cutting edge, and a right blade side with a right side cutting edge; the U-shaped adjustable blade being slideably associated with the left side and the right side of the flat base near the bottom end such that the U-shaped adjustable blade is extendable outwards from the front side of the flat base, to a selected distance between the support bar and the front blade side, the selected distance matching a thickness of the exterior portion; and a locking element for securing the U-shaped adjustable blade to the selected distance. Thus, an advantage may be the removal of a rind, peel, skin, or any exterior portion of a fruit or vegetable may be simple, fast, and efficient for a user.

In another aspect, an adjustable peeling utensil for peeling a fruit or vegetable is providing, having a U-shaped adjustable blade, and a handle having a top end, a bottom end, a left side, a right side, a front side, and a back side; the handle being wider and rounded at the back side and narrower at the front side at the association with the base. Thus, an advantage may be that the adjustable peeling utensil is ergonomically rounded to fit a hand and ergonomically rounded with an indent at the top end to fit a thumb.

In another aspect a method of separating an exterior portion from an interior portion of a fruit or vegetable using an adjustable peeling utensil is provided. Thus, an advantage may be that a removal of the exterior portion of a fruit or vegetable is simple, fast, and efficient for a user.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
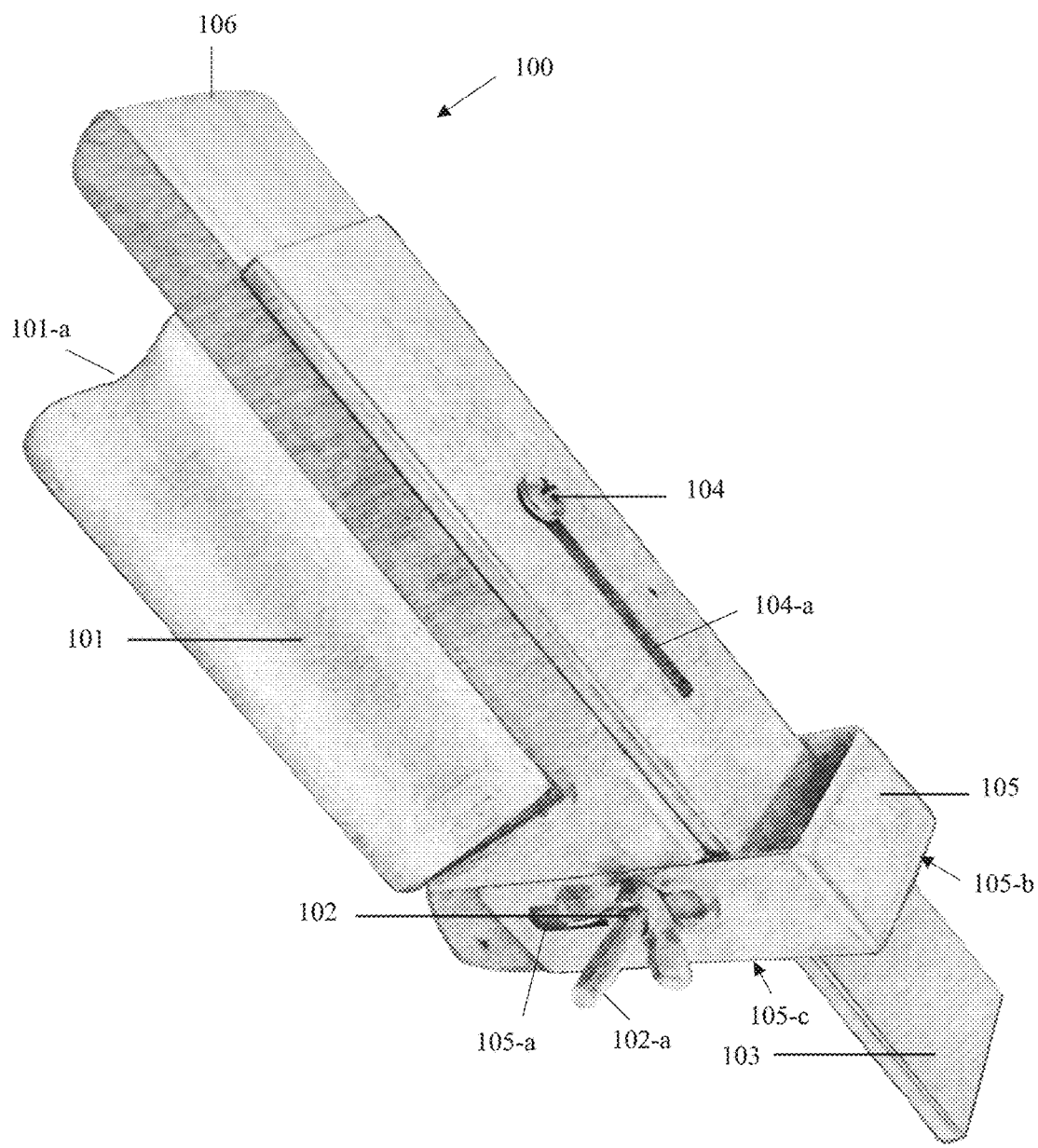
FIG. 1 illustrates the side perspective view of an adjustable peeling utensil, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the side perspective view of an adjustable peeling utensil 100 ("adjustable peeling utensil," "peeling utensil," or "peeler"), according to an aspect. The peeling utensil 100 may be used for separating a peel, skin, rind, or any type of exterior portion from the interior portion of a fruit, vegetable, or any other similar food. The peeling utensil 100 may include a base 106, and a handle or grip 101, which may include an indent 101-a for an ergonomic hold. As an example, the handle may have a front side associated with the base 106, and may have a wider back side. The back side of the handle 101 may also be rounded, to fit a hand. The indent 101-a may be positioned at the top end of the handle 101, to fit a thumb of a user. The handle 101 may be narrower at the front side, at the association with the base 106, thus, providing an ergonomic hold for the user. The base 106 and handle 101 may be integral with one another, such that the peeling utensil 100 may be manufactured with the base 106 and handle 101 as one piece, or they may be two pieces and attached. The base 106 may be a flat piece for the attachment or association of the handle 101 and a support bar 103 ("support bar," "guide" or "support guide"), which may be slideable and retractable, while in contact with the base 106. The support bar or guide 103 may guide the user in creating consistent cuts. The base 106 and the handle 101 may be constructed from wood, for example, or any other suitable material.

The peeling utensil 100 may include an adjustable blade or knife 105 for cutting, which may be associated with a locking screw 102 through a horizontal opening 105-a. The locking screw 102 may, as an example, be a wing nut with a screw, or any other suitable nut and a bolt 102-a or other locking element. The blade 105 may be positioned near the bottom end of the base 106, and may be slideably associated with the base. The blade 105 may be oriented at an angle to the base 106 and handle 101. The blade 105 may be substantially a similar shape of the base 106, such that when in a fully closed position, the blade 105 may rest snugly against the support bar 103 and sides of the base 106. The blade 105 may thus substantially be U-shaped have a squared U shape, and may have a leading cutting edge 105-b ("leading edge" or "leading cutting edge"), and two blade side edges ("side edge" or "side cutting edge," right side edge shown as 105-c). The leading edge 105-b and the side edges 105-c may be sharp and used for cutting.

A locking screw 102 with a bolt 102-a may be provided on each side of the peeling utensil 100, and may be used for locking the blade 105 in a desired position. A retractable support bar 103 may be included, which may be associated with a guiding pin 104 ("guiding pin," "pin," "guiding screw," "guiding stopper," or "stopper") through a vertical opening or cutout 104-a. The stopper may be a screw as shown as an example. The vertical opening 104-a may be located in the center of the support bar 103. As shown as an example, the support bar 103 may be in a lowered state, stopped by the guiding pin 104. The support bar 103 may slide up or down and may be guided by the guiding screw 104 through the opening 104-a. The support bar and blade may be constructed from metal, or any suitable material.

Figure 2:
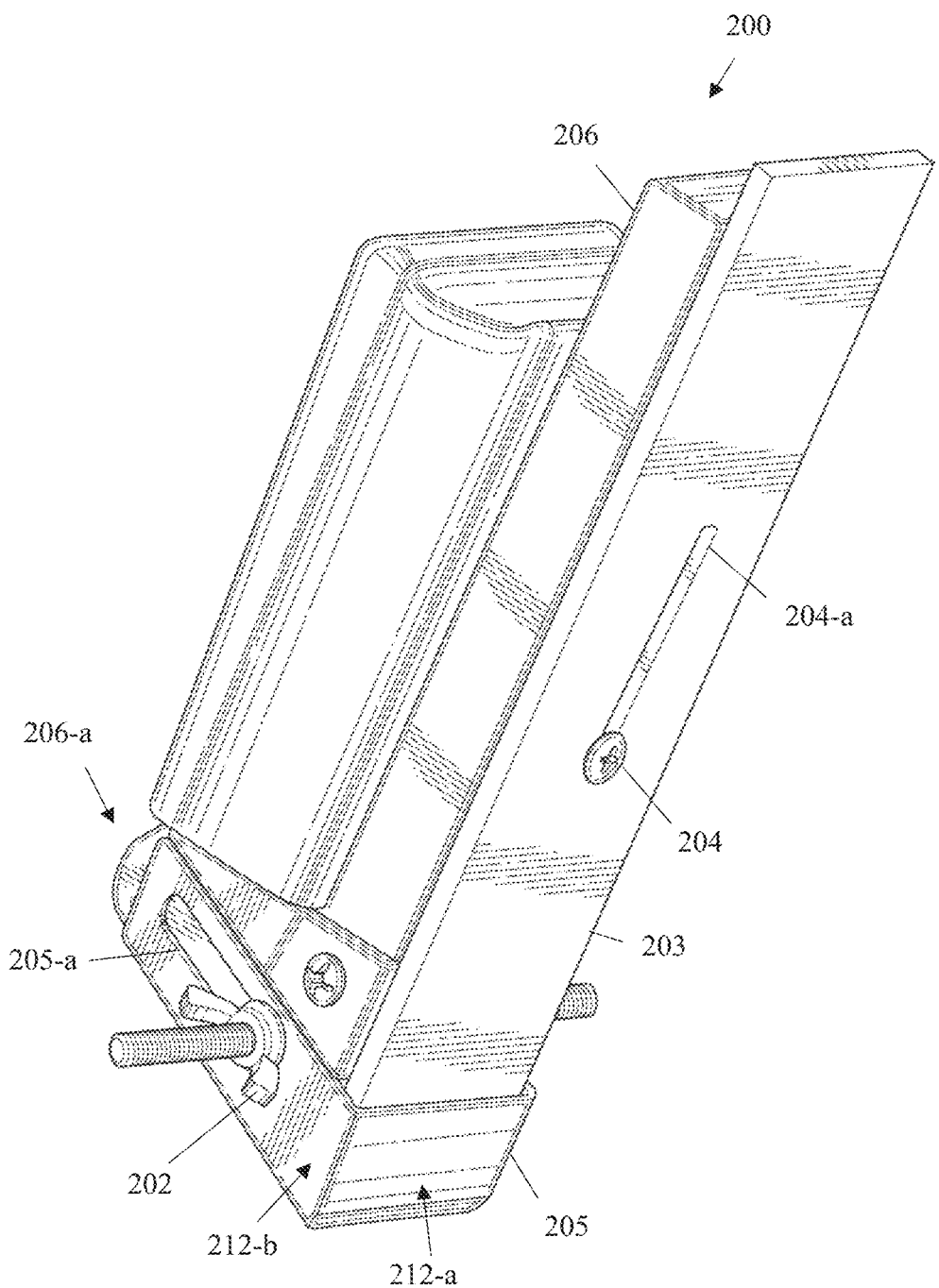
FIG. 2 illustrates the side perspective view of an adjustable peeling utensil with the support bar in a raised state and the blade is a closed position, according to an aspect.

FIG. 2 illustrates the side perspective view of an adjustable peeling utensil 200 with the support bar 203 in a raised state and the blade 205 in a closed position, according to an aspect. As examples, for storage or for additional safe handling, the blade 205 may be locked into a closed state by pushing the blade against the support bar 203 and base 206 and engaging the locking element 202. Again, the blade 205 may have a squared U shape such that the blade fits snugly around the base. The front side 212-a of the blade 205 ("front blade side") may fit against the support bar 203, and the right side and left side of the blade ("right blade side," and "left blade side," right side 212-b visible only) may fit snugly against the right side and left side of the base 206 when the blade is closed. The blade 205 may be held in the closed position by, for example, a wing nut any other suitable locking screw 202. The base 206 may have a large bottom end 206-a such that all parts of the blade 205 rest against the base. For additional safety, the adjustable peeling utensil 200 may be configured such that no parts of the cutting edges of the blade 205 are exposed when the blade is in a closed position, as shown. To open and adjust the blade 205, the screw 202 may be loosened, and the blade 205 may be moved along the horizontal opening 205-a and may be guided by the screw 202. To hold the blade 205 at a desired position, the screw 202 may be tightened. The support bar may be movable along the vertical opening 204-a, and may be guided by a pin 204. When in a fully raised position as shown as an example, the pin 204 may be positioned at the bottom of the vertical opening 204-a.

Figure 3:
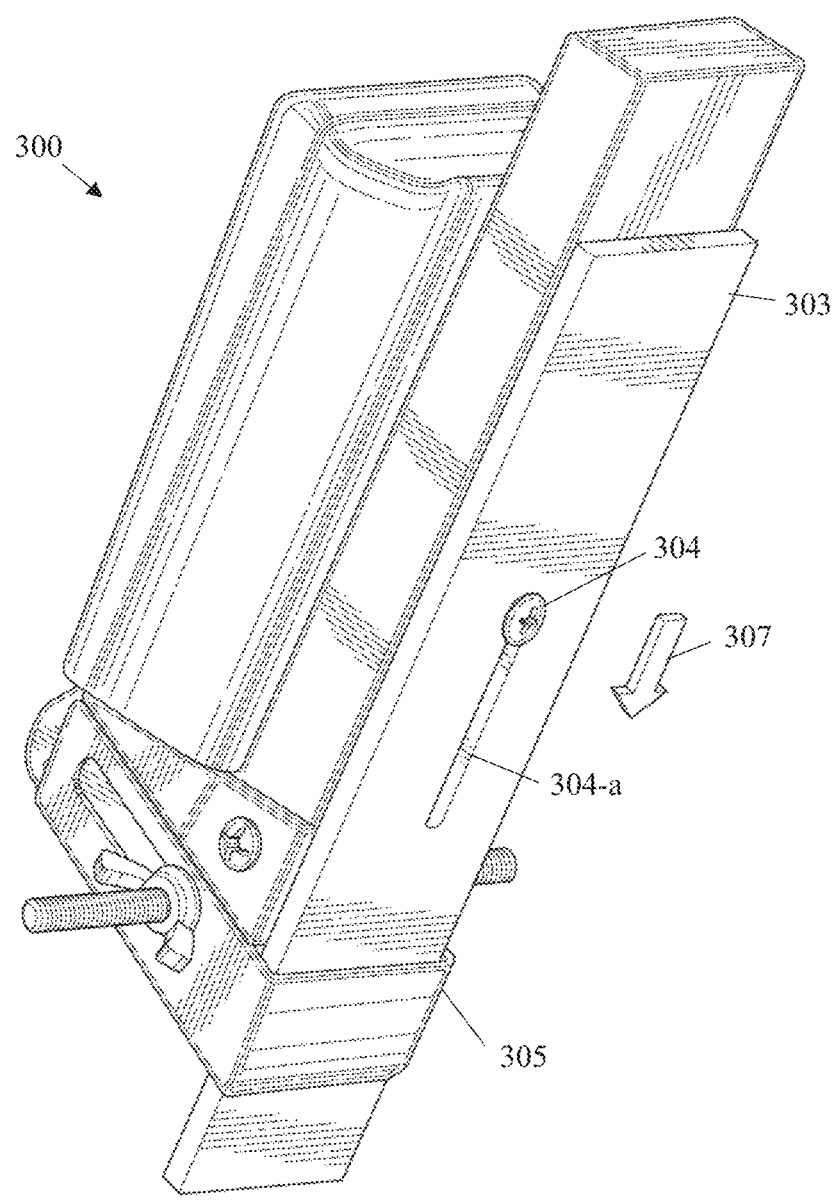
FIG. 3 illustrates another example of the side perspective view of the peeling utensil with the support bar in a lowered state and the blade in a closed position, according to an aspect.

FIG. 3 illustrates another example of the side perspective view of the peeling utensil 300 with the support bar 303 in a lowered state and the blade 305 in a closed position, according to an aspect. The support bar 303 may freely slide along the vertical opening 304-a and may be held in place by a pin 304. The support bar 303 may be fully lowered when pushed or lowered by gravity in the direction indicated by arrow 307. As shown as an example, when the support bar 303 is in a fully lowered state, the pin 304 may be located at the top of the vertical opening 304-a.

Figure 4:
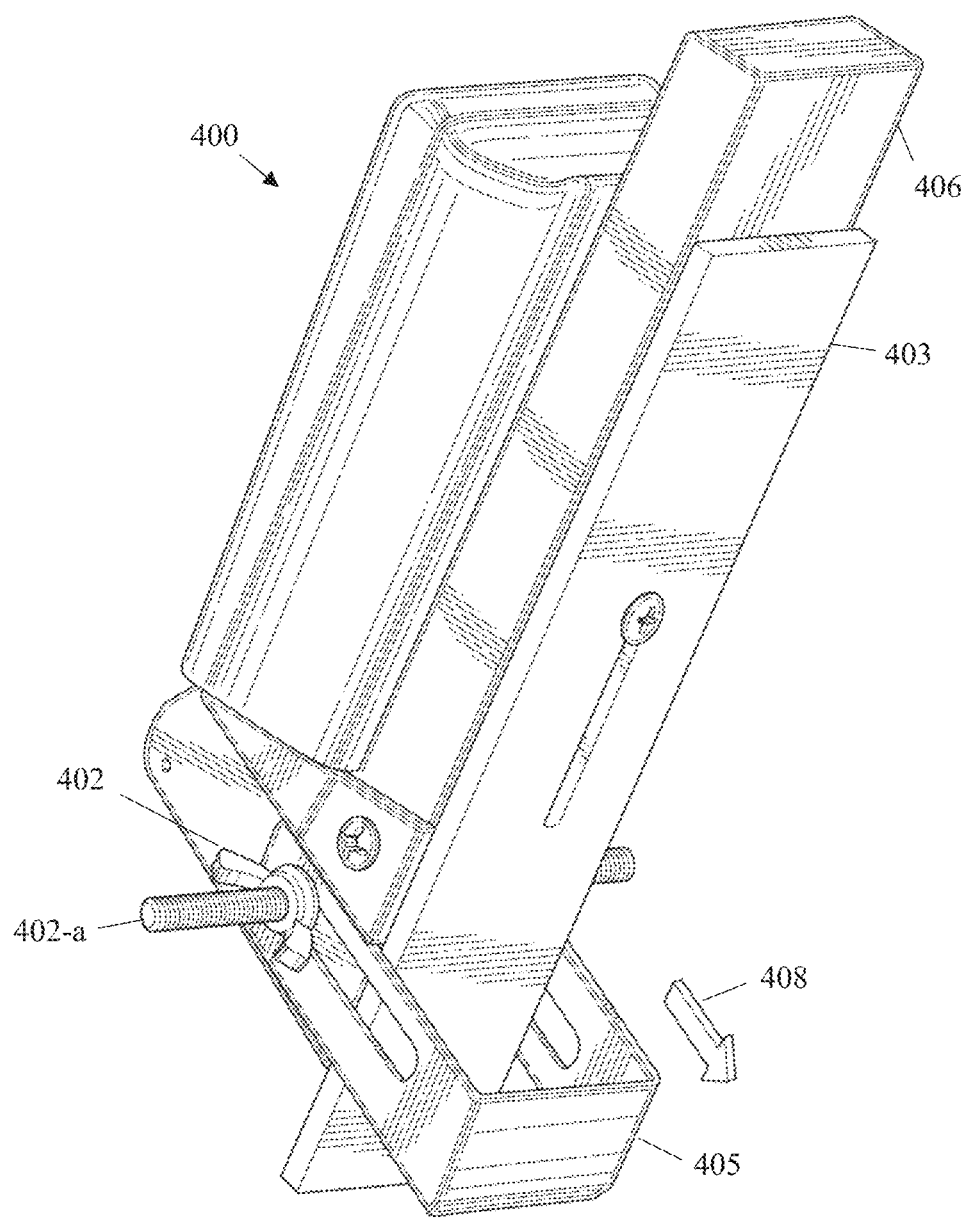
FIG. 4 illustrates the side perspective view of an adjustable peeling utensil with the support bar in a lowered state and the blade in a fully opened state, according to an aspect.

FIG. 4 illustrates the side perspective view of an adjustable peeling utensil 400 with the support bar 403 in a lowered state and the blade 405 in a fully opened state, according to an aspect. The blade 405 may be opened and adjusted to a selected distance, such that a cut may be made on a fruit or vegetable, for example, at a preferred depth, and the blade may be long enough such that a single cut may be large enough to remove a thick rind of a large fruit or vegetable, for example. The size of the cut may be enlarged by extending or pulling the blade out from the front side of the base 406, for example. First, the locking screw 402 may be loosened which may allow the blade 405 to freely be adjusted. As an example, a cut with a large depth may be made by opening the blade to a fully opened position, as shown, with the blade pulled out as far as allowed by the bolt 402-a and locking screw 402, in the direction indicated by arrow 408. The blade may be slidable along the base, near the bottom end of the base 406. The user may determine how large of a cut will need to be made for the fruit or vegetable or any other item to be cut or peeled, and adjust the blade to the preferred depth. The depth of the cut may be large enough such that the pulp or other interior portion under the skin or rind of the fruit or vegetable may be exposed once the adjustable peeling utensil 400 is used to cut away the skin or rind, or exterior portion. The blade 405 may then be locked into the preferred depth by engaging or tightening the locking screw 402. The blade 405 may have at least three sharp sides, such that when placed with the support bar on the outer surface of the fruit or vegetable to be cut, the blade may cut in U or squared U shape. Thus, the peeling utensil 400 may make a three-sided cut into an outer edge of a fruit or vegetable, cutting away a strip of the skin, rind, or peel.

Figures 5A, 5B:
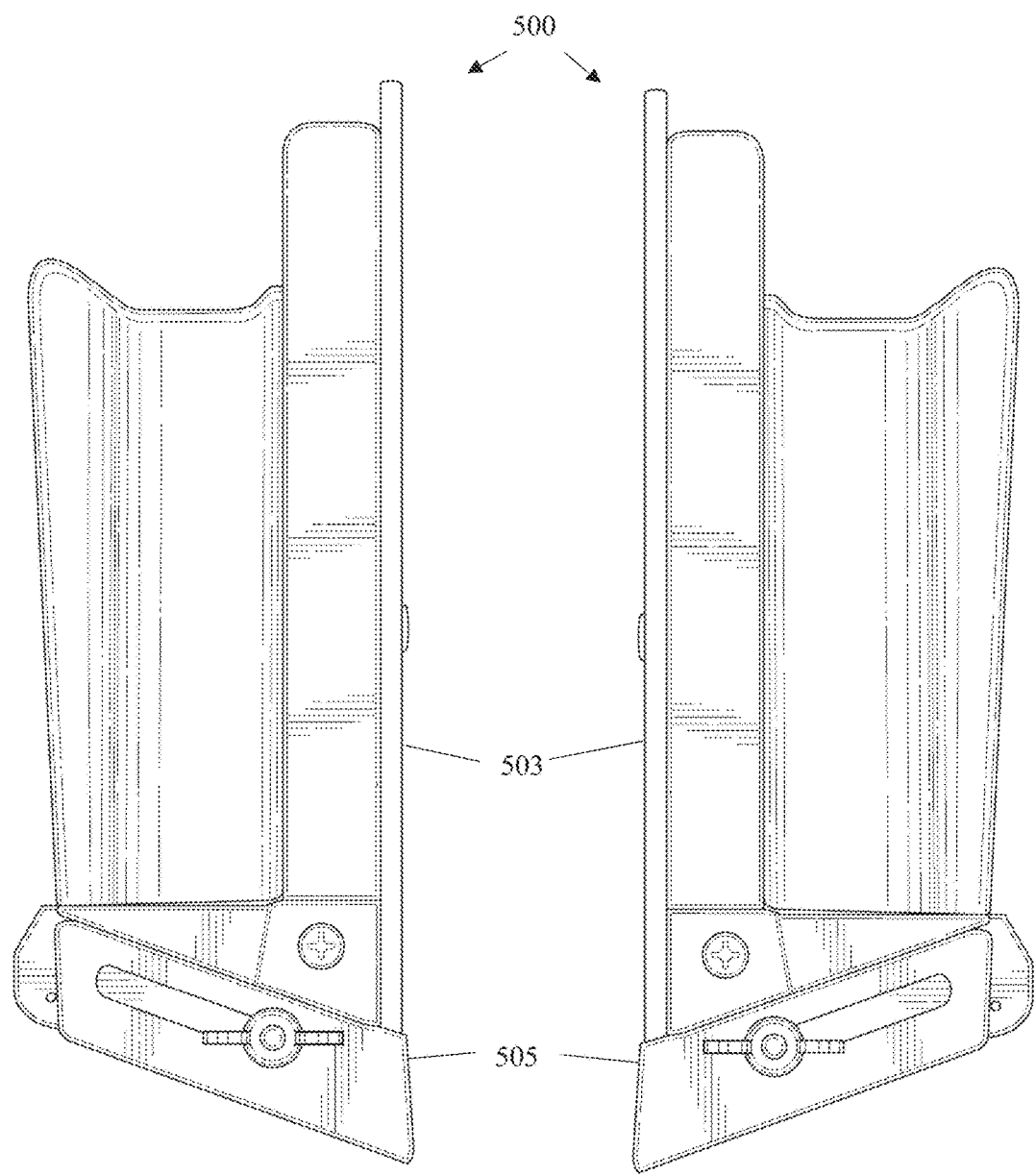
FIG. 5a illustrates a left side elevation view of an adjustable peeling utensil, according to an aspect.
FIG. 5b illustrates a right side elevation view of an adjustable peeling utensil, according to an aspect.

FIG. 5a illustrates a left side elevation view of an adjustable peeling utensil 500, according to an aspect. As shown as an example, the blade 505 may be in a fully closed position, and the support bar 503 may be in a fully raised position.

FIG. 5b illustrates a right side elevation view of an adjustable peeling utensil 500, according to an aspect. Again, as shown as an example, the blade 505 may be in a fully closed position, and the support bar 503 may be in a fully raised position.

Figure 6A:
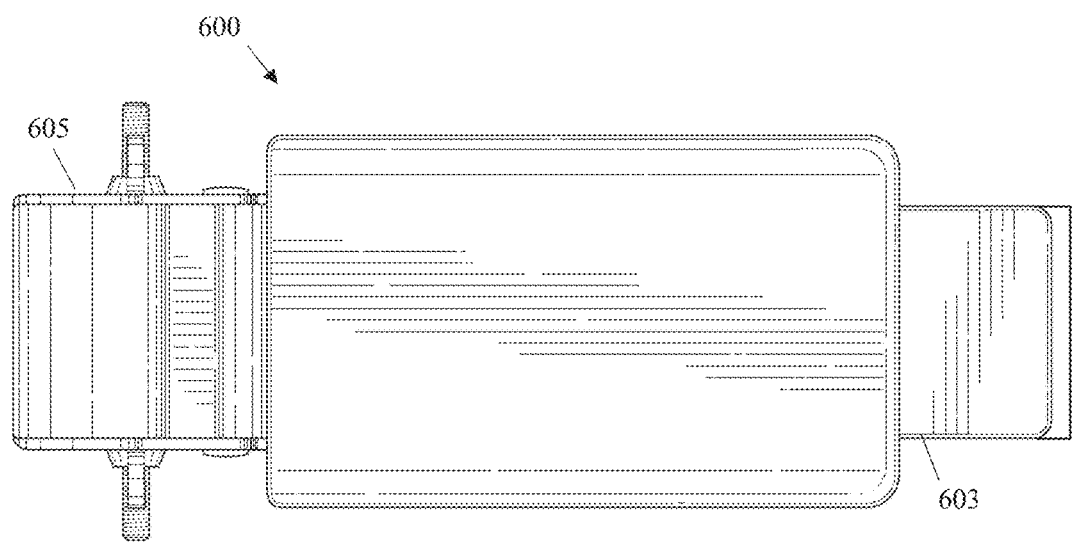
FIG. 6a illustrates a back elevation view of an adjustable peeling utensil, according to an aspect.

FIG. 6a illustrates a back elevation view of an adjustable peeling utensil 600, according to an aspect. Again, as shown as an example, the blade 605 may be in a fully closed position, and the support bar 603 may be in a fully raised position.

Figure 6B:
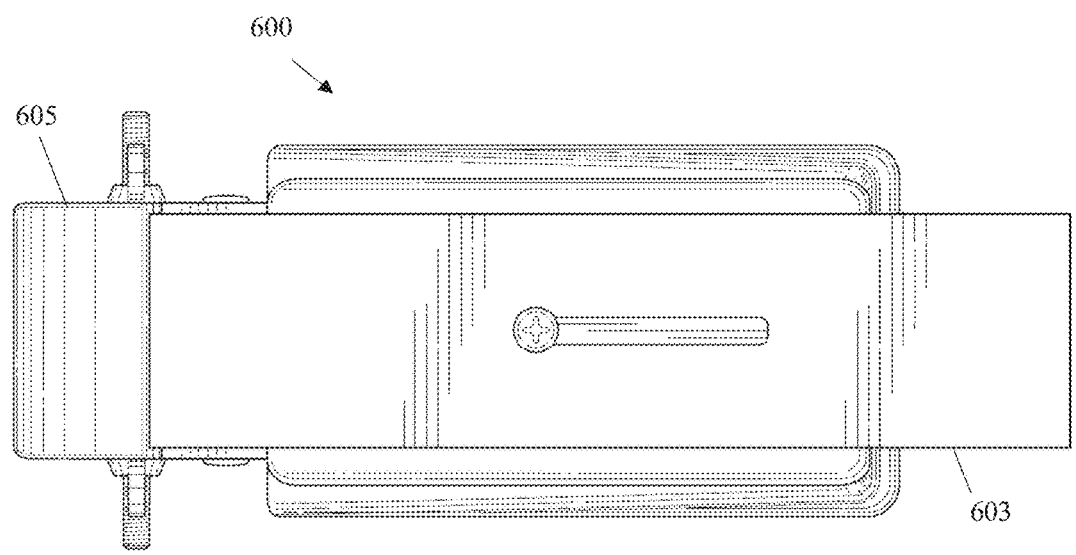
FIG. 6b illustrates a front side elevation view of an adjustable peeling utensil, according to an aspect.

FIG. 6b illustrates a front side elevation view of an adjustable peeling utensil 600, according to an aspect. Again, as shown as an example, the blade 605 may be in a fully closed position and the support bar 603 may be in a fully raised position.

Figure 7A:
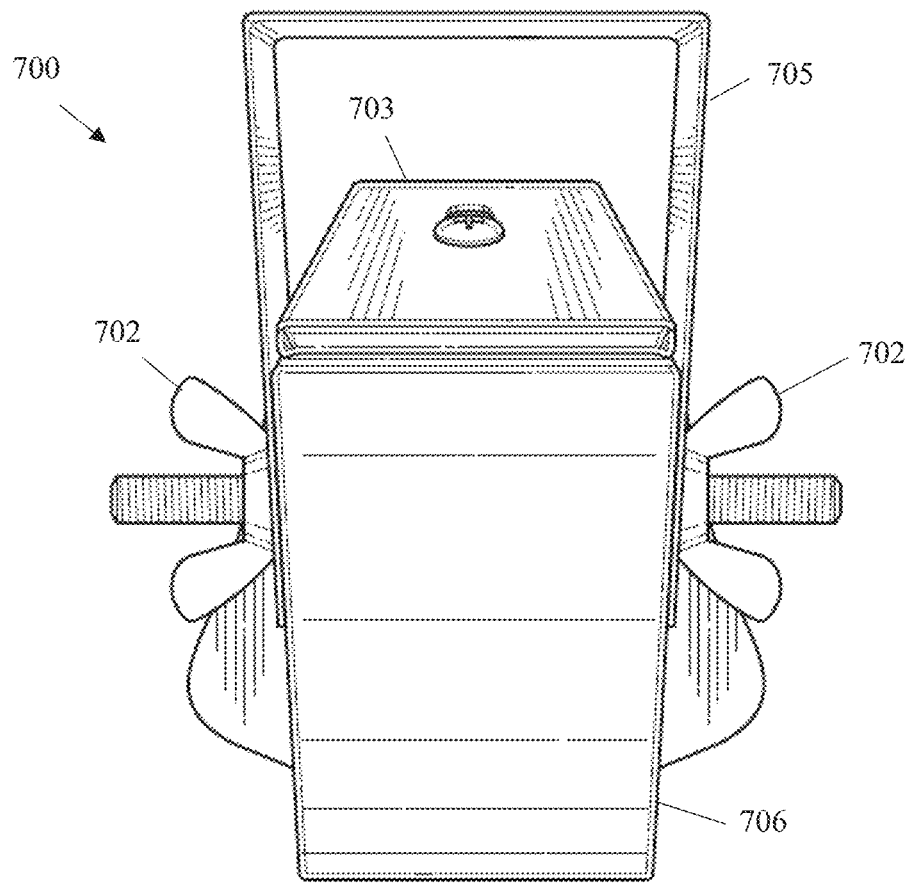
FIG. 7a illustrates a bottom perspective view of an adjustable peeling utensil with the blade in an opened state, according to an aspect.

FIG. 7a illustrates a bottom perspective view of an adjustable peeling utensil 700 with the blade 705 in an opened position, according to an aspect. As shown, the locking screws 702 may be tightened into the sides of the base 706 to hold the blade 705 in an opened position. As shown as an example, the support bar 703 may be in a fully raised state. The sharpened cutting edge of the blade 705 may face towards the bottom of the adjustable peeling utensil 700, and the entire bottom of the blade 705 may have a cutting edge. The blade 705 may be U-shaped, and may be a squared U-shape as shown.

Figure 7B:
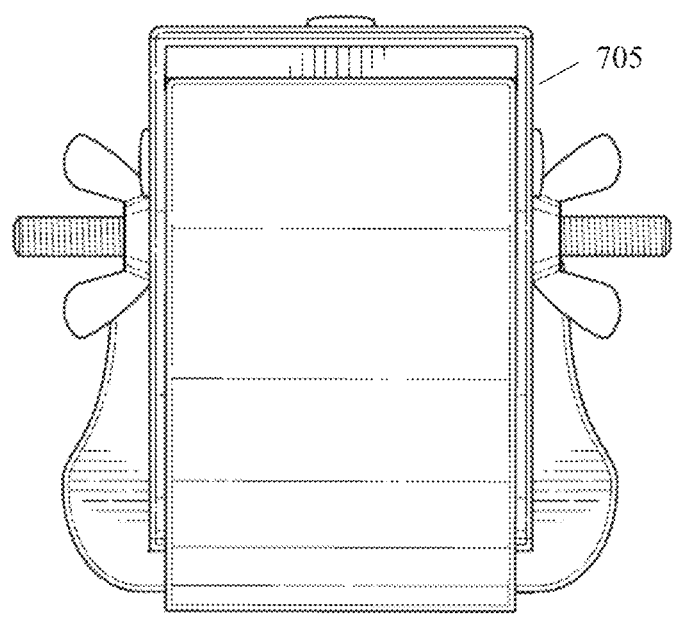
FIG. 7b illustrates a bottom elevation view of an adjustable peeling utensil with the blade in a closed position, according to an aspect.

FIG. 7b illustrates a bottom elevation view of an adjustable peeling utensil 700 with the blade 705 in a closed position, according to an aspect.

Figure 7C:
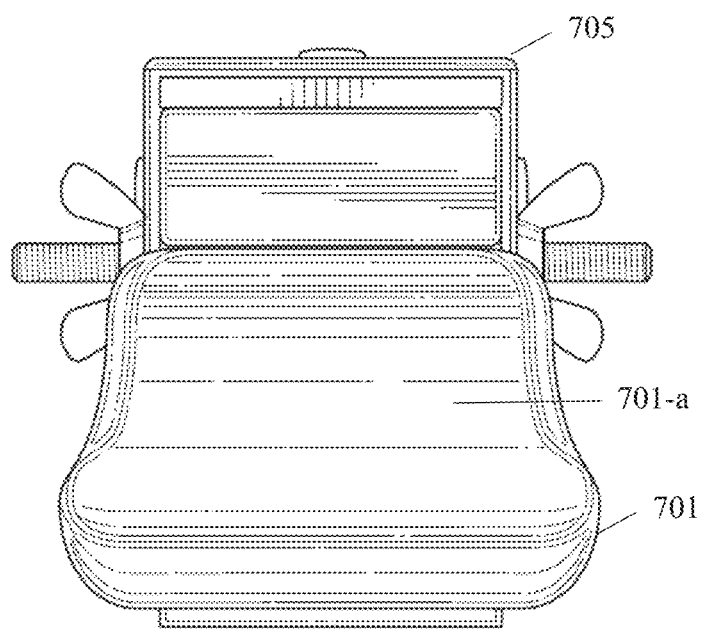
FIG. 7c illustrates a top elevation view of an adjustable peeling utensil with the blade in a closed position, according to an aspect.

FIG. 7c illustrates a top elevation view of an adjustable peeling utensil 700 with the blade 705 in a closed position, according to an aspect. The user may use the indent 701-a at the top of the handle for placing their thumb, for example, for ease of use and for an ergonomic and comfortable grip while cutting.

Figure 8:
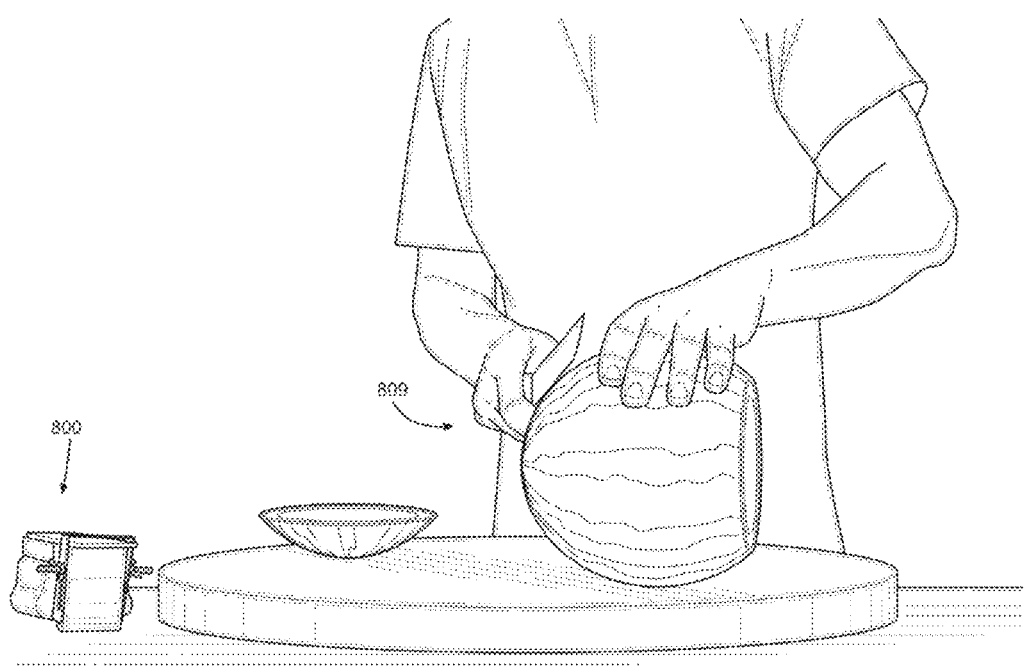
FIG. 8 illustrates step 1 of an exemplary method of using an adjustable peeling utensil, according to an aspect.

FIG. 8 illustrates step 1 of an exemplary method of using an adjustable peeling utensil 800, according to an aspect. A fruit 809 such as, for example, a watermelon as shown, may be prepared for peeling by cutting off the ends by any suitable means.

Figure 9:
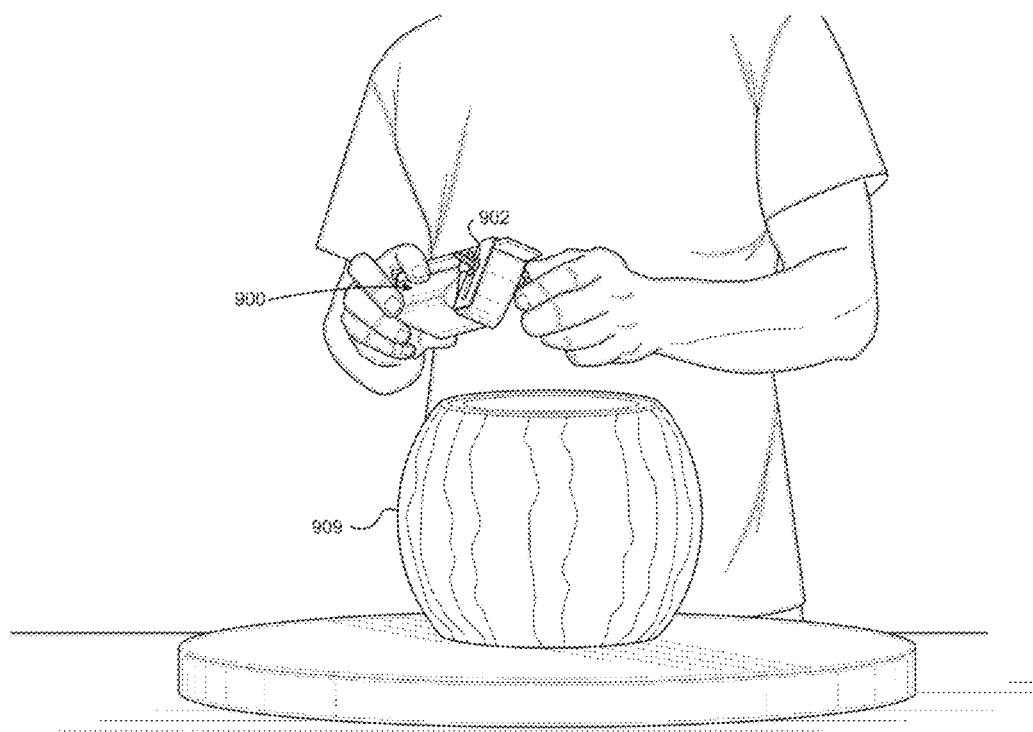
FIG. 9 illustrates step 2 of an exemplary method, showing the adjusting of the blade of the adjustable peeling utensil, according to an aspect.

FIG. 9 illustrates step 2 of an exemplary method, showing the adjusting of the blade of the adjustable peeling utensil 900, according to an aspect. The user may change the depth of the cut made by the adjustable peeling utensil 900 according to the size of the rind to be peeled off of the fruit 909, and the user may then lock the blade into position using the locking screws 902.

Figure 10A:
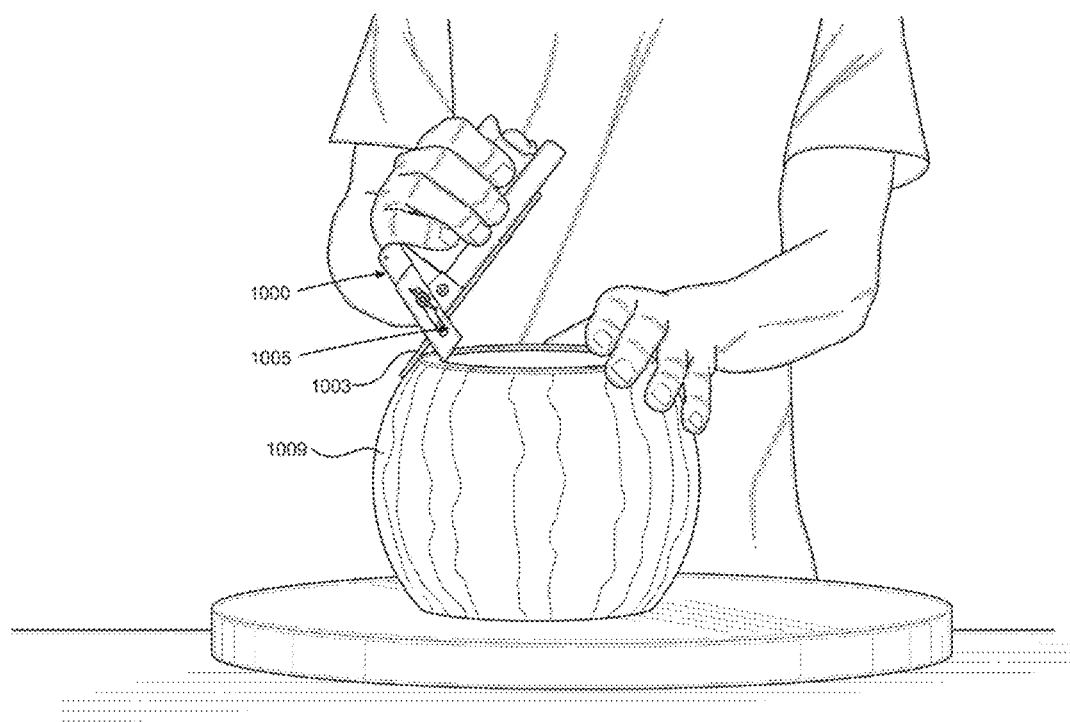
FIG. 10a illustrates step 3 of an exemplary method, showing the beginning of the cut of the fruit, according to an aspect.

FIG. 10a illustrates step 3 of an exemplary method, showing the beginning of the cut of the fruit 1009, according to an aspect. The adjustable peeling utensil 1000 may be positioned such that the blade 1005 slices a U-shape out of the rind of the fruit, with the leading edge (as shown in FIG. 1) of the blade 1005 facing towards the center of the fruit, and the support bar 1003 resting against the outside of the fruit 1009. The support bar 1003 may then provide the user with a convenient and easy way to hold the adjustable peeling utensil 1000 steadily in place as the cut is made, and may allow the user to begin each cut in a consistent manner. When the adjustable peeling utensil 1000 is held upright by the user as shown, the support bar 1003 may be lowered by gravity into a fully lowered position.

Figure 10B:
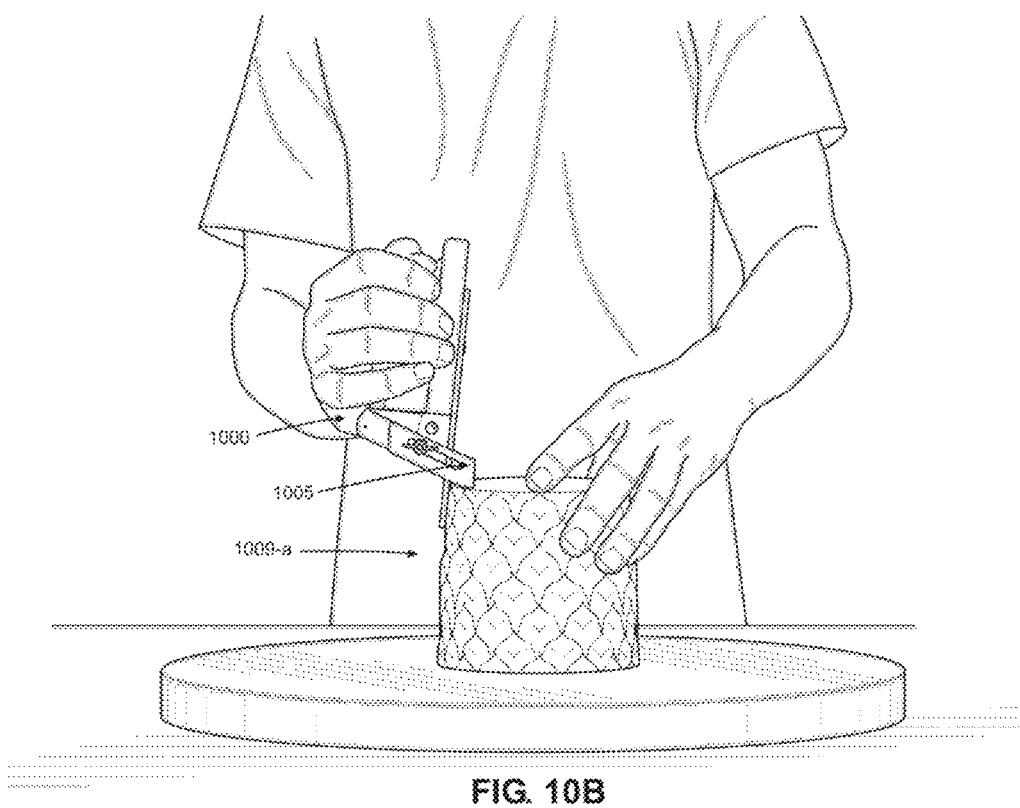
FIG. 10b illustrates another example of step 3 of an exemplary method, according to an aspect.

FIG. 10b illustrates a back perspective view of another example of step 3 of an exemplary method, according to an aspect. As another example, any fruit having a skin, rind, or peel, such as a pineapple 1009-a, may be peeled using the adjustable peeling utensil 1000, with the blade 1005 facing towards the inner portion of the fruit 1009-a.

Figure 11:
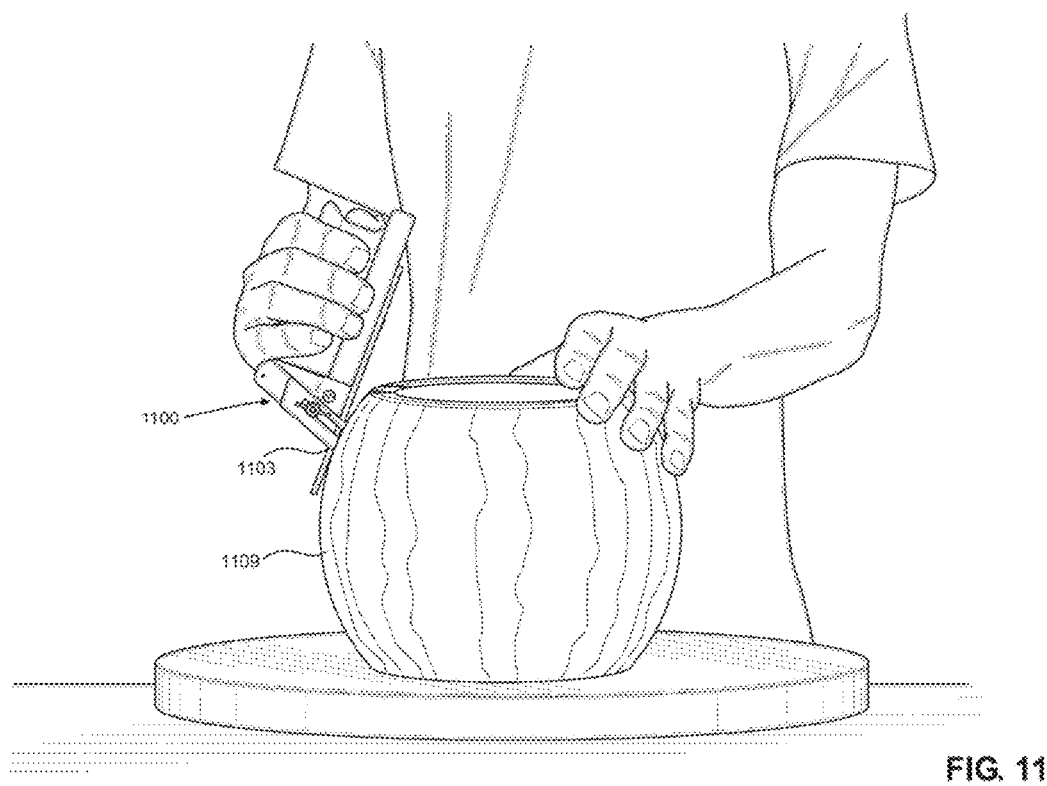
FIG. 11 illustrates step 4 of an exemplary method, showing the cut down the side of the fruit, according to an aspect.

FIG. 11 illustrates step 4 of an exemplary method, showing the cut down the side of the fruit 1109, according to an aspect. While holding the adjustable peeling utensil 1100 in position as shown in FIGS. 10a-10b, the user may push the utensil 1100 downwards, while pressing the support bar 1103 against the exterior portion of the fruit or vegetable 1109, to create a cut.

Figure 12:
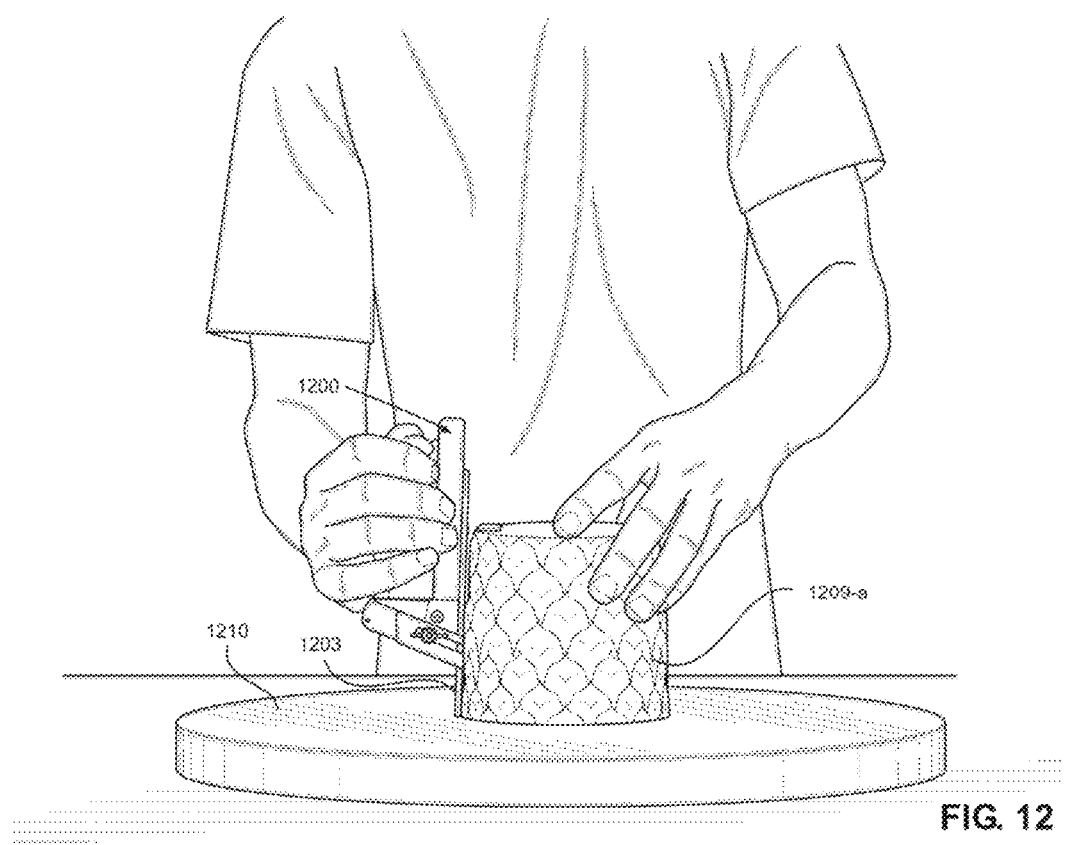
FIG. 12 illustrates step 5 of an exemplary method, showing the partial retraction of the support bar of the adjustable peeling utensil, according to an aspect.

FIG. 12 illustrates step 5 of an exemplary method, showing the partial retraction of the support bar 1203 of the adjustable peeling utensil 1200, according to an aspect. As the cut is made by the user pushing the peeling utensil 1200 downwards, the support bar 1203 may slide upwards and retract when it makes contact with a surface 1210 that the fruit 1209-a is resting on, which may allow the user to complete the cut all the way to the bottom of the fruit 1209-a.

Figure 13:
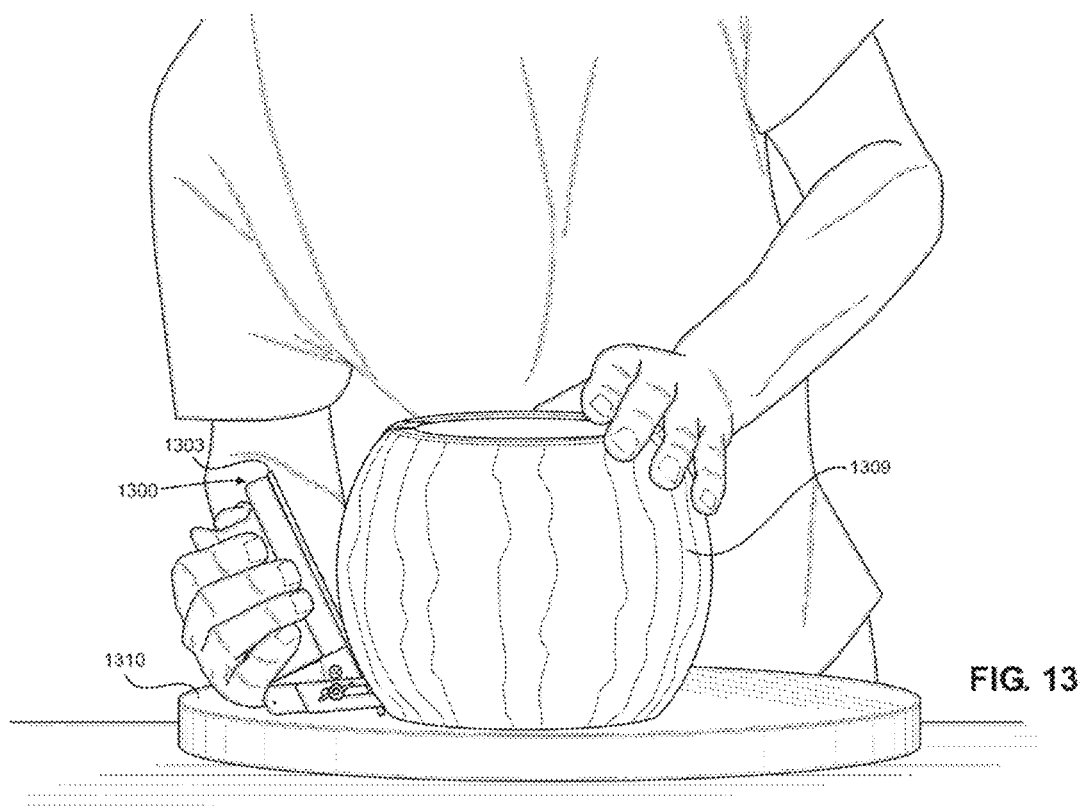
FIG. 13 illustrates step 6 of an exemplary method, showing the full retraction of the support bar of the adjustable peeling utensil, according to an aspect.

FIG. 13 illustrates step 6 of an exemplary method, showing the full retraction of the support bar of the adjustable peeling utensil 1300, according to an aspect. Once the user cuts the fruit 1309 all the way to the bottom, the support bar 1303 may be fully raised and retracted, allowing the blade to reach to the surface 1310 the fruit 1309 is resting on.

Thus, the user may peel a strip all the way along the contour of the fruit or vegetable 1309 using the adjustable peeling utensil 1300.

Figure 14:
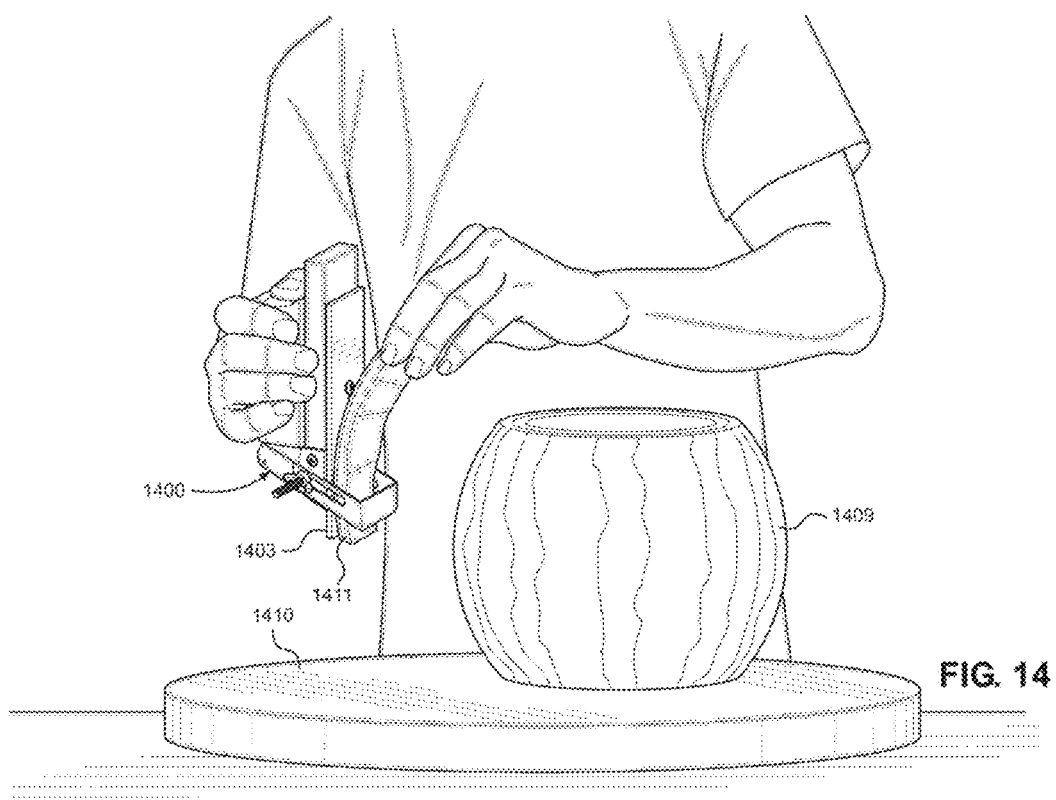
FIG. 14 illustrates step 7 of an exemplary method, showing a portion of the fruit's rind removed, according to an aspect.

FIG. 14 illustrates step 7 of an exemplary method, showing a portion of the fruit's rind removed, according to an aspect. The user may complete a cut all the way down the side of a fruit 1409 from the top end to the bottom end, and cut away and remove a strip of the rind, skin, or peel 1411. Again, due to gravity, when the user lifts the adjustable peeling utensil 1400 from the surface 1410, the support bar 1403 may be lowered.

Figure 15:
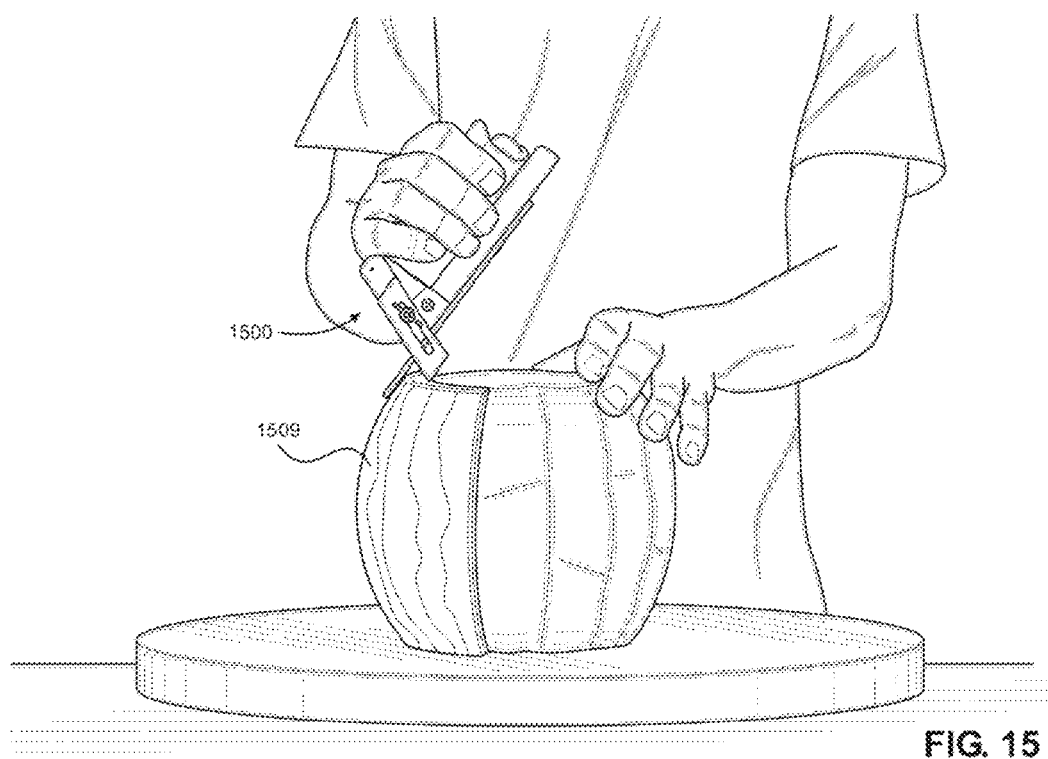
FIG. 15 illustrates step 8 of an exemplary method, showing the adjustable peeling utensil continuing the peeling process around the partially peeled fruit, according to an aspect.

FIG. 15 illustrates step 8 of an exemplary method, showing the adjustable peeling utensil 1500 continuing the peeling process around the partially peeled fruit 1509, according to an aspect. Steps 3-7 may be repeated as needed around the fruit 1509.

Figure 16A:
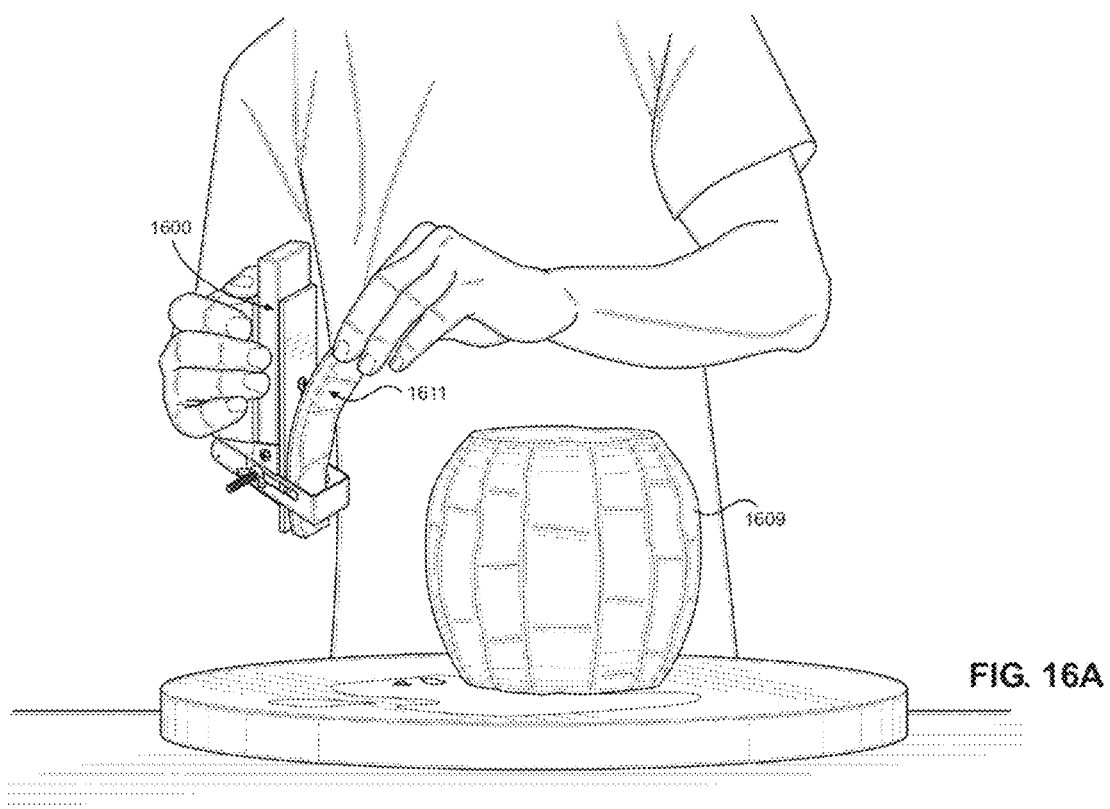
FIGS. 16a-16b illustrate two examples of step 9 of an exemplary method, showing a fruit fully peeled by the adjustable peeling utensil, according to an aspect.
Figure 16B:
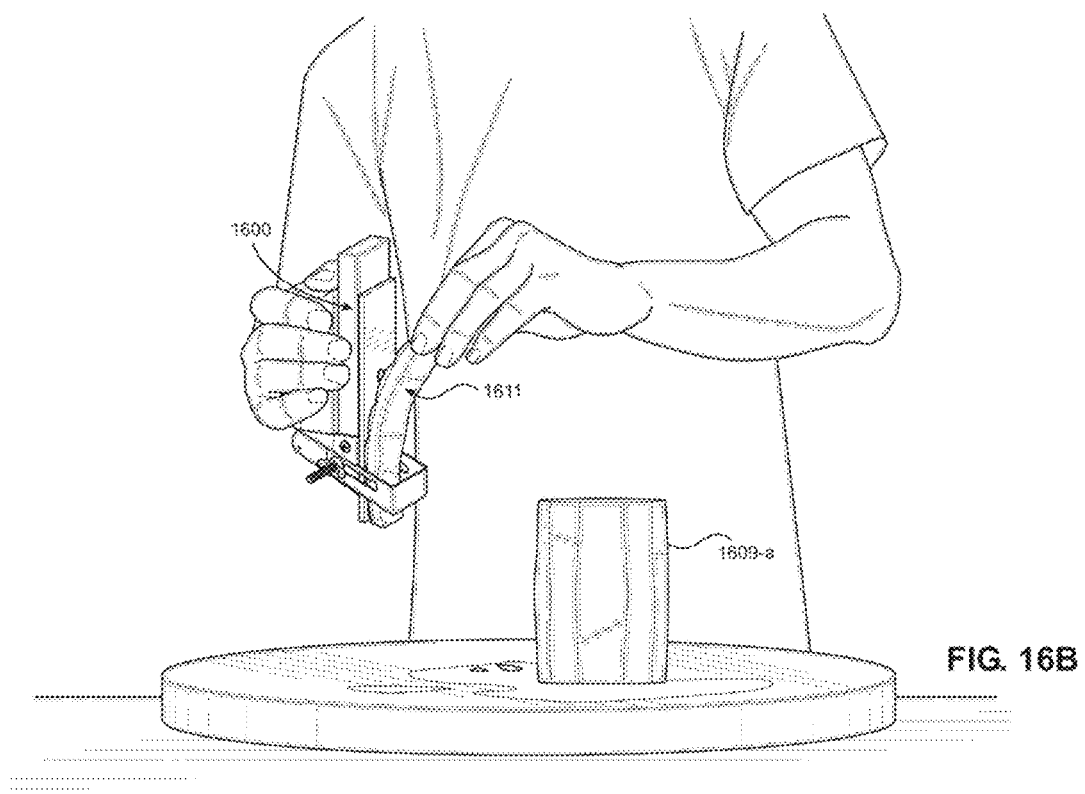

FIGS. 16a-16b illustrate two examples of step 9 of an exemplary method, showing a fruit fully peeled by the adjustable peeling utensil 1600, according to an aspect. As shown, a fruit 1609 or 1609-a may have their skin, peel, or rind fully removed by the adjustable peeling utensil 1600 as the user removes strips 1611 of the exterior portion of the fruit, and the user may make consistently sized cuts all around the fruit in order to do so. Thus, a fully peeled fruit or vegetable may be provided by the adjustable peeling utensil 1600.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An adjustable peeling utensil configured to peel an exterior portion from an interior portion of a fruit or vegetable, comprising: a flat base having a front side, a back side, a left side, a right side, a top side, and a bottom side; the flat base being associated with a handle on the back side and having a support bar configured to slide parallel with the front side and within a U-shaped adjustable blade; and the U-shaped adjustable blade having a front blade side with a leading cutting edge, a left blade side with a left side cutting edge, and a right blade side with a right side cutting edge; the U-shaped adjustable blade being slideably associated with the left side and the right side of the flat base near the bottom end such that the U-shaped adjustable blade is linearly extendable outwards from the front side of the flat base, to a selected distance between the support bar and the front blade side, the selected distance matching a thickness of the exterior portion; and a locking element for securing the U-shaped adjustable blade to the selected distance.

2. The adjustable peeling utensil of claim 1, wherein the U-shaped adjustable blade is configured to fit snugly onto the base such that the front blade side fits against the support bar, the left blade side fits against the left side of the base and the right blade side fits against the right side of the base when the U-shaped adjustable blade is in a closed state.

3. The adjustable peeling utensil of claim 1, further comprising a stopper holding the support bar to the base through an opening in the support bar and allowing a sliding movement of the support bar.

4. The adjustable peeling utensil of claim 1, wherein the locking element is a wing nut and a bolt.

5. The adjustable peeling utensil of claim 1, the handle further comprising a top end, a bottom end, a left side, a right side, a front side, and a back side; the handle being wider and rounded at the back side and narrower at the front side at the association with the base, thus being ergonomically rounded to fit a hand; and having a rounded indent at the top end to fit a thumb.

6. The adjustable peeling utensil of claim 1, wherein the stopper is a screw.

7. An adjustable peeling utensil configured to peel an exterior portion from an interior portion of a fruit or vegetable, comprising: a flat base having a front side, a back side, a left side, a right side, a top side, and a bottom side: the flat base being associated with a handle on the back side and having a support bar configured to slide parallel with the front side and within a U-shaped adjustable blade; and the U-shaped adjustable blade having a front blade side with a leading cutting edge, a left blade side with a left side cutting edge, and a right blade side with a right side cutting edge; the U-shaped adjustable blade being slideably associated with the left side and the right side of the flat base near the bottom end such that the U-shaped adjustable blade is linearly extendable outwards from the front side of the flat base, to a selected distance between the support bar and the front blade side, the selected distance matching a thickness of the exterior portion; a locking element for securing the U-shaped adjustable blade to the selected distance; and wherein the handle comprises a top end, a bottom end, a left side, a right side, a front side, and a back side; the handle being wider and rounded at the back side and narrower at the front side at the association with the base, thus being ergonomically rounded to fit a hand; and having a rounded indent at the top end to fit a thumb.

8. The adjustable peeling utensil of claim 7, wherein the U-shaped adjustable blade is configured to fit snugly onto the base such that the front blade side fits against the support bar, the left blade side fits against the left side of the base and the right blade side fits against the right side of the base when the U-shaped adjustable blade is in a closed state.

9. The adjustable peeling utensil of claim 7, further comprising a stopper holding the support bar to the base through an opening in the support bar and allowing a sliding movement of the support bar.

10. The adjustable peeling utensil of claim 7, wherein the locking element is a wing nut and a bolt.

11. The adjustable peeling utensil of claim 7, wherein the stopper is a screw.

12. A method of separating an exterior portion from an interior portion of a fruit or vegetable using an adjustable peeling utensil having a base, a U-shaped adjustable blade having a front blade side with a leading cutting edge, a left blade side with a left side cutting edge, and a right blade side with a right side cutting edge, the U-shaped adjustable blade being slideably associated with the base, and a support bar slideably associated with the base; comprising the steps of:
  providing a fruit or vegetable with the top end and a bottom end previously removed; placing the bottom end on a surface;
  adjusting the U-shaped adjustable blade into a desired position such that a selected distance between the front blade side of the adjustable blade and the support bar matches a thickness of the exterior portion;
  locking the U-shaped adjustable blade into the desired position;
  placing the adjustable peeling utensil on the top end of the fruit or vegetable with the support bar resting against the exterior portion of the fruit or vegetable;
  pushing downwards to begin a cut;
  pushing down onto the surface such that the U-shaped adjustable blade cuts all the way to the bottom end and the support bar is completely retracted; and repeating the cut all the way around the fruit or vegetable until the exterior portion is fully removed.

13. The method of claim 12, wherein the U-shaped adjustable blade is configured to fit snugly onto the base such that the front blade side fits against the support bar, the left blade side fits against the left side of the base and the right blade side fits against the right side of the base when the U-shaped adjustable blade is in a closed state.

14. The method of claim 12, further comprising a locking element for securing the U-shaped adjustable blade to the selected distance.

15. The method of claim 12, further comprising a handle comprising a top end, a bottom end, a left side, a right side, a front side, and a back side; the handle being wider and rounded at the back side and narrower at the front side at the association with the base, thus being ergonomically rounded to fit a hand; and having a rounded indent at the top end to fit a thumb.

16. The method of claim 12, further comprising a stopper holding the support bar to the base through an opening in the support bar and allowing a sliding movement of the support bar.

* * * * *